Feb. 7, 1950 — R. C. GADDIS — 2,496,463
SELF-UNLOADING WAGON
Filed Feb. 7, 1948
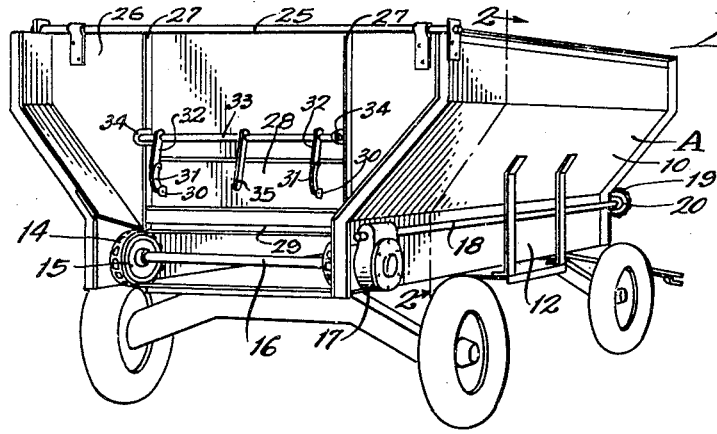
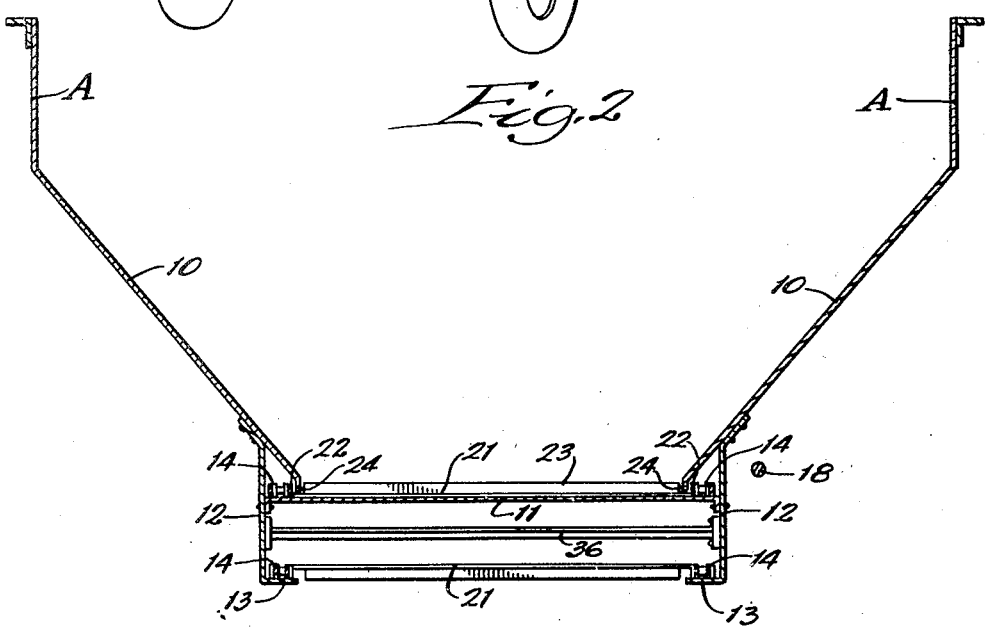
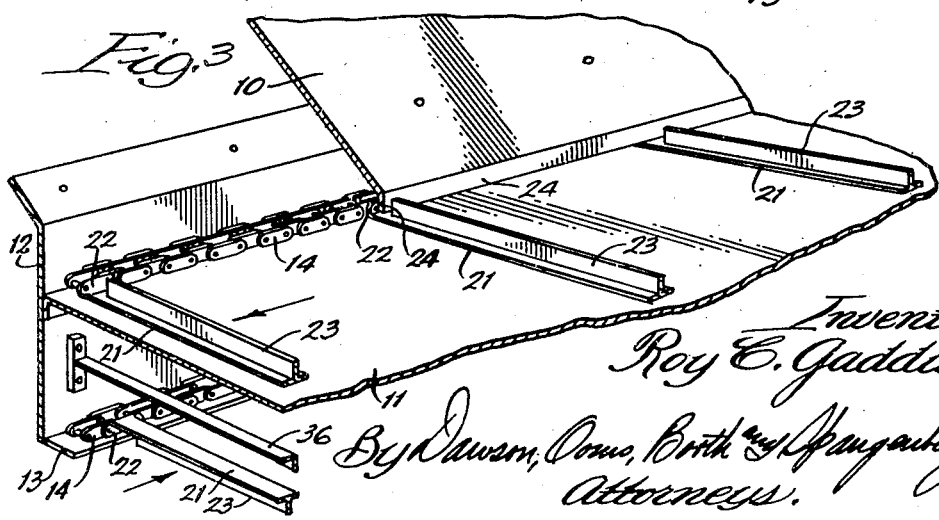
Inventor:
Roy C. Gaddis,
By Dawson, Ooms, Booth and Spangenberg,
Attorneys.

Patented Feb. 7, 1950

2,496,463

UNITED STATES PATENT OFFICE 2,496,463

SELF-UNLOADING WAGON

Roy C. Gaddis, Cedar Rapids, Iowa

Application February 7, 1948, Serial No. 6,922

3 Claims. (Cl. 214—83.36)

This invention relates to a wagon unloader, and more particularly to a wagon equipped with chain conveyors in which the side walls of the wagon form a guard or seal about the chains.

In wagon unloaders heretofore produced, considerable grain and other contents of the wagon have been lost by the passing of the material into the spaces between the link parts of the chain and also out through the space at the rear of the wagon between the gate or closure and the side walls and bed of the wagon. In such structures, the side walls of the wagon have been brought down to a point above the chains and there terminated, with the result that grain and other material tends to work its way under the side walls and about the chains and also through the resulting open area at the rear of the wagon. Such losses have been considered unavoidable.

An object of the present invention is to provide a simple structure which effectively eliminates the above loss and provides a tight seal about the chains, excluding grain therefrom and permitting the gate at the rear of the wagon to form a tight seal with the bed of the wagon. Yet another object is to provide a wagon structure, in which the side walls approach very closely the bottom or bed of the wagon and serve to maintain the feed blades or straps close to the wagon bed, while at the same time providing a shield about the chains to exclude grain and other material therefrom. A still further object is to provide a wagon unloader, or similar structure, equipped with endless chains and feed blades carried thereby, and in which a chain guard forms a continuation of the side walls of the wagon and extends downwardly and into the space between the blades and the chains to provide a seal about the chains, while also providing a track for snugly receiving the wagon gate at the rear thereof to form a tight seal at the rear of the wagon. Other specific objects and advantages will appear as the specification proceeds.

The invention is illustrated, in a single embodiment, by the accompanying drawing, in which:

Figure 1 is a perspective view of a self-unloading wagon equipped with structure embodying my invention; Fig. 2, a transverse sectional view, the section being taken as indicated at line 2 of Fig. 1; and Fig. 3, a broken perspective view, on an enlarged scale, of the conveyor and conveyor shield structure.

In the illustration given, A designates a wagon equipped with side walls 10 tapering inwardly toward the bottom or bed 11 of the wagon. The wagon is equipped with the depending frame members or brackets 12, having inwardly-turned flanges 13. Endless chain conveyors 14 are provided for each side of the wagon extending longitudinally thereof. The upper flight of each chain 14 rests upon the bed 11, and the lower flight rests upon the inwardly-turned flange 13, as shown more clearly in Fig. 2. Each chain is engaged at its end by a sprocket wheel 15 mounted upon a shaft 16. Since such structure is old, a detailed description is herein believed unnecessary. The rear shaft 16 is equipped with a gear enclosed within the casing 17 and driven by a gear on the end of shaft 18. It will be understood that shaft 18 is driven at its forward end by a chain 19 engaging a gear 20 fixed to shaft 18. The chain engages another gear (not shown) in the forward part of the wagon, and means are provided for coupling a shaft carrying such gear with a driving shaft on a tractor. Since such structure is old and well known, a detailed description is herein unnecessary.

As shown more clearly in Figs. 2 and 3, the link chain 14 has spaced units therein equipped with metal straps 21. The straps 21 are relatively thin and extend along the bottom or bed 11 of the wagon and at their ends are turned upwardly and welded or otherwise secured to the inner face of a chain link. The upwardly-extending portion 22 at each end of the strap 21, as shown more clearly in Figs. 2 and 3, preferably lies flat against the inner face of the link with which it is aligned and is preferably secured thereto by spot welding, or by other means. Integral with the strap 21 or secured thereto is an upwardly-extending blade 23. The blade 23 is cut away at each end so as to be spaced from the upwardly-extending portion 22. The member 22 and the adjacent end of the blade 23 form a U-shaped slot therebetween, as shown more clearly in Fig. 2.

The side walls 10 of the wagon, which taper inwardly, are extended to a point beyond the inner portions of the chains 14, and then are provided with a depending flange portion 24, which extends into the U-shaped slot between the members 22 and 23 and terminate barely above the strap 21. Thus, there is formed by the lower extension of the walls 10 and the vertical flange portion 24, a chain shield extending longitudinally of each of the chains and excluding from the chains grain and other material carried within the wagon. The lower portion of the walls 10, including the flanges 24, may be formed of a separate strip, if desired, in order to provide the chain guard, or, the walls 10 may be provided with integral extensions, as shown in Figs. 2 and 3, to provide the enclosure about the chains 14. It will be noted that the upper flight of each chain 14 is thus supported within a box or enclosure bounded on one side by the bracket 12, and on the inner side by the vertical portion 24 of the side wall 10. The bottom or bed 11 of the wagon is also preferably supported by the depending frame members or brackets 12, as shown more clearly in Fig. 2. The space between the lower end of the chain guards 24 and the bed 11 is just sufficient to permit the straps 21 to slide therebetween.

The wagon A is provided at its rear with the usual hinge rod 25, upon which is mounted the rear closure frame 26. The frame 26 is equipped with the angle iron members 27, and a gate 28 is slideably mounted in a slot within the angle members to form a closure for the opening at the rear end of the wagon. The lower end of the gate 28 is preferably provided with a flexible grain-retaining web 29 formed of heavy canvas, or other suitable material.

The gate may be raised and lowered by any suitable mechanism. In the illustration given, the gate 28 is provided with a pair of links 30 fixed at their inner ends to the gate and pivotally connected at their outer ends to the feed gate arms 31. The feed gate arms 31 are pivotally connected at their upper ends to the links 32, which are fixed upon the rotatable shaft 33. The shaft 33 is rotatably mounted at its ends within brackets 34 welded to the angle members 27, and the shaft 33 is equipped with a lever 35 for manual rotation thereof in the raising and lowering of the gate. It will be observed that the supporting of the gate 28, so that it moves snugly between the chain guard flanges 24, provides a tight seal at the rear of the wagon and prevents the escape of grain and other material.

The depending frame members or brackets 12 may be connected by cross-struts or beams 36 to form a sturdy support for the wagon bed and the chain-supporting flanges.

Operation

In the operation of the wagon, the closure 28 is swung to closed position, as illustrated in Fig. 1, so as to form a tight seal extending between the flanges 24 of the side walls 10, and the wagon may then be filled with grain or other material. When it is desired to unload the grain, etc., the handle lever 35 may be swung upwardly, thus drawing the gate 28 to raised position and permitting the grain, etc. to flow rearwardly from the wagon. The tractor propeller shaft is set into operation to drive the chain 19, gear 20, shaft 18, and then, by means of the worm and worm gear in casing 17, the shaft 16. The two endless chains 14 carried by the gear wheels 15 are then moved in the direction of the arrow, as illustrated in Fig. 3. The spaced straps 21 move under the chain guards 24 and draw the blades 23 toward the outlet opening at the rear of the wagon. Grain is fed inwardly by the inclined walls toward the blades 23, and is drawn by the blades through the rear opening of the wagon.

With the structure shown, it will be observed that the inner portion of the walls 10, in addition to providing a guard chain and an enclosure about the chain to prevent the passage of grain toward the chain, serves as an upper guide for the straps 21 and chain adjacent the bed 11 of the wagon. Thus, there is an effective discharge of grain, while at the same time providing no space for the escaping of the grain in a lateral direction. Further, when the gate is closed and the wagon is again filled with grain, there is no space left at the rear of the wagon for the escape of grain therefrom.

The chain guard or shield in addition to acting as a seal about the chain, preventing the loss of grain, etc., also prevents the chain from rising up throughout the box when material, such as wet sand, wet lime, dirt, etc., is being unloaded. This sticky or tenacious material tends to force the chain upwardly, with the result that the bottom of the floor is not kept clean and a hard layer of material builds upon the floor. With the shield as described, the chains are held down and the blades remove all of the material down to the floor itself. The shield and cross-strip structure thus cause the straps to follow along the floor while at the same time preventing the loss of material about the chains.

While in the foregoing specification, I have set forth the structure in considerable detail for the purpose of illustrating one embodiment of the invention, it will be understood that such details of structure may be varied widely by those skilled in the art without departing from the spirit of my invention.

I claim:

1. In a wagon of the character set forth, having side walls tapering inwardly and terminating in downwardly-extending flanges, brackets secured to said side walls and extending therebelow, said brackets being provided at their bottom with inwardly-turned flanges, a wagon bed fixed at its ends to said brackets and extending below the flanges of said side walls, endless conveyor chains having their upper flights supported upon said bed and their lower flights supported upon said bracket flanges, means for advancing said chains to cause the upper flight thereof to move toward the rear of said wagon, straps having upwardly-turned ends fixed to chain links at opposite sides of the wagon and extending below the flanges of said side walls, and blades carried by said straps and providing with said upwardly-turned portions of said straps U-shaped spaces receiving the flanges of said side walls.

2. In a wagon of the character set forth, having side walls tapering inwardly and terminating in downwardly-extending flanges, brackets secured to said side walls and extending therebelow, said brackets being provided at their bottom with inwardly-turned flanges, a wagon bed fixed at its ends to said brackets and extending below the flanges of said side walls, endless conveyor chains having their upper flights supported upon said bed between said side wall flanges and said bracket walls, and their lower flights supported upon said bracket flanges, means for advancing said chains to cause the upper flight thereof to move toward the rear of said wagon, straps having upwardly-turned ends fixed to chain links at opposite sides of the wagon and extending below the flanges of said side walls, and blades carried by said straps and providing with said upwardly-turned portions of said straps U-shaped spaces receiving the flanges of said side walls.

3. In a wagon of the character set forth, having side walls tapering inwardly and terminating in downwardly-extending vertical flanges, brackets secured to said side walls and extending therebelow, said brackets being provided at their bottom with inwardly-turned flanges, a wagon bed fixed at its ends to said brackets and extending below the flanges of said side walls, endless conveyor chains having their upper flights supported upon said bed and their lower flights supported upon said bracket flanges, means for advancing said chains to cause the upper flight thereof to move toward the rear of said wagon, straps having their ends fixed to chain links at opposite sides of the wagon and extending below the flanges of said side walls, and blades carried by said straps and providing with the conveyor chains U-shaped vertical spaces receiving the downwardly-turned vertical flanges of said side walls.

ROY C. GADDIS.

REFERENCES CITED

The following references are of record in the file of this patent:

UNITED STATES PATENTS

| Number | Name | Date |
|---|---|---|
| 1,488,858 | Arndt | Apr. 1, 1924 |
| 1,880,155 | Ruth | Sept. 27, 1932 |
| 2,056,501 | Berger et al. | Oct. 6, 1936 |
| 2,274,314 | Whaley | Feb. 24, 1942 |